United States Patent [19]
Lysen et al.

[11] Patent Number: 5,527,111
[45] Date of Patent: Jun. 18, 1996

[54] CONTACT TEMPERATURE SENSOR

[75] Inventors: Heinrich Lysen, Ismaning; Johannes G. Hölzl, München, both of Germany

[73] Assignee: Pruftechnik Dieter Busch AG, Ismaning, Germany

[21] Appl. No.: 165,216

[22] Filed: Dec. 10, 1993

[30] Foreign Application Priority Data

Dec. 24, 1992 [DE] Germany .................... 42 44 189.7

[51] Int. Cl.⁶ .................. G01K 1/14; G01K 7/04
[52] U.S. Cl. .............. 374/208; 374/165; 374/179; 136/221; 136/233
[58] Field of Search ................ 374/208, 165, 374/179; 136/221, 230, 232, 233

[56] References Cited

U.S. PATENT DOCUMENTS

| | | | |
|---|---|---|---|
| 3,412,359 | 11/1968 | Schwyn et al. | 374/185 |
| 3,751,305 | 8/1973 | Huebscher | 136/221 |
| 4,241,289 | 12/1980 | Bowling | 136/221 |
| 4,265,117 | 5/1981 | Thoma et al. | 374/165 |
| 4,321,827 | 3/1982 | Anderson | 374/165 |
| 4,614,443 | 9/1986 | Hamert | 374/208 |
| 4,770,545 | 9/1988 | Takada et al. | 374/208 |
| 5,176,451 | 1/1993 | Sasada et al. | 136/221 |
| 5,297,716 | 3/1994 | Smith et al. | 136/221 |

FOREIGN PATENT DOCUMENTS

| | | | |
|---|---|---|---|
| 1935236 | 1/1966 | Germany . | |
| 1996275 | 11/1968 | Germany . | |
| 3038956 | 3/1982 | Germany . | |
| 4039339 | 10/1991 | Germany . | |
| 4039339 | 6/1992 | Germany . | |
| 4039336 | 6/1992 | Germany . | |
| 0219841 | 9/1986 | Japan | 374/208 |
| 0800692 | 1/1981 | U.S.S.R. | 136/221 |
| 0932260 | 7/1963 | United Kingdom | 136/221 |

OTHER PUBLICATIONS

Patent Abstracts of Japan, P–508, vol. 10 No. 308 Oct. 21, 1986, JP 61–120931, Jun. 9, 1986 (only abstract considered).

*Primary Examiner*—Diego F. F. Gutierrez
*Attorney, Agent, or Firm*—Kirkpatrick & Lockhart

[57] ABSTRACT

The invention provides a contact temperature sensor consisting of a planar contact plate, a thermocouple element attached to the contact plate for determining the temperature of the contact plate, and a deflectable and tiltable holding system. The connection lines to the thermocouple element are wound around a tube. By vulcanisation with a rubber-elastic material, a one-piece elastic formed body is produced which connects together the contact plate, holding piece and inner tube. Through the rubber-elastic spring action and the deflectability and tiltability of the contact plate with reference to the surface of the object of measurement, and improved flow of heat to the contact plate and improved measurement results are achieved.

12 Claims, 3 Drawing Sheets

CONTACT TEMPERATURE SENSOR

BACKGROUND OF THE INVENTION

1. Technical Field of the Invention

The invention relates to a contact temperature sensor for determining the surface temperature of an object of measurement, a contact plate with a temperature sensitive element being pressed, thermally isolated, against the object of measurement.

2. Description of the Invention Background and Prior Art

A contact temperature sensor for pipelines is known from DE-A-30 38 956. Here, the temperature sensitive element is in a contact part with variously curved outer walls. In dependence upon the form of the object, a corresponding outer wall is selected and, with the sensor, is pressed closely against the measurement object. It is disadvantageous that the contact sensor is not suitable for variable outer surfaces, it does not permit point measurements and requires a long measurement time.

DE-A-40 39 339 describes a contact temperature sensor with which a plane contact plate, with a measuring element, is through under-pressure attached by suction flush to the object surface. The contact plate is part of a displaceable sensor and sealing arrangement, which can also tilt to a slight degree. In this way, a better placement of the contact plate against the object is achieved than is otherwise achievable by pressing against, screwing to, spring loading against or with the use of magnets. The technical outlay involved for the under-pressure arrangement is, however, considerable.

DE-OS 40 39 336 discloses a temperature measurement head for a coordinate measurement apparatus. Formed as a contact temperature sensor, the measurement head serves for rapid workpiece temperature measurement. It consists of a sleeve, fixed to a housing, and a spring-movable deflectable part at the lower end of which a ball joint forms a second bending point. The ball joint comprises a sensor part having a plane contact plate and a temperature sensitive measuring element. The second bending point in the measurement head system is intended to ensure a flat placement of the contact plate against the measurement object surface. Through the additional ball joint bending point, inclined dispositions of the work piece surface with respect to the axis of the measurement head system of up to 10 degrees can be compensated. It is, however, disadvantageous that the additional ball joint bending point is technically complicated and quickly becomes stiff.

The reason for the unreliability and deficient measurement accuracy of hand-held devices is not clear. Probably, however, with hand-held devices the contact plate is not placed sufficiently flush on the object surface. On the one hand, the contact plate must not be too small, since otherwise even the smallest contamination or deposit could disproportionately affect the heat flow to the contact surface. Also, a visual check of whether the contact plate is in fact placed flush or is tilted would not be possible. Further, small contact plates are mechanically less robust, and easily bend, since contact is often accomplished with a relatively high bearing pressure. Hand-held devices with small contact plates are therefore only accurate when new and are not really practicable.

On the other hand, if the contact plate is formed to be relatively large, point measurements can no longer be obtained. Further, the measurements require more time, as a result of the greater thermal capacity of the plate. It is also a disadvantage of large contact plates that sufficiently large plane areas on the object are often not available. There is thus a requirement that the contact plate of the contact temperature sensor have a breadth approximating that of a pencil, i.e. between 0.2 and 1.2 cm diameter.

With such hand-held devices it is to be noted, however, that they do not lead to accurate measured values even when they are provided, as above, with one or more joints serving the flush placement of the contact plate. This is partly the result of the fact that, over the necessary measurement time of ca. 5 to 30 seconds, the hand cannot be held still or begins to tremble, as a result of continual body movements. This leads continuously to small tiltings of the contact plate, and the disturbance of the uniform flow of heat to the contact plate. Conventional joints between the gripping part and the contact plate cannot overcome this problem, since the forces involved in tilting are very small when a small bearing area is involved. If the contact plate is more firmly pressed on, the trembling of the hand also increases. Moreover, the trembling movements of the hand are of many different kinds and of large dynamic range, such that they cannot be countered with conventional joint constructions.

OBJECT OF THE INVENTION

The object of the invention is to make available a contact temperature sensor which overcomes the above-mentioned disadvantages of the prior art. The contact temperature sensor should in particular be suitable for hand-held devices. The sensor should be mechanically robust, insensitive to contamination and economical to manufacture.

SUMMARY OF THE INVENTION

According to the present invention there is provided a contact temperature sensor, comprising a contact plate of heat conductive material, a temperature element attached to the contact plate for detecting the temperature of the contact plate, and a deflectable and tiltable holding system for placement of the contact plate flush on the surface of the object of measurement, wherein the holding system is made essentially of a formed body holder of rubber-elastic material for permitting elastic spring action, deflectability and tiltability of the contact plate with respect to the surface of the object whose temperature is to be measured, hereinafter referred to as the measurement object or the object of measurement.

The construction of the holder in accordance with the invention permits an improved flush placement of the contact plate on the surface of the measurement object. Trembling movements of the hand are ideally compensated through the rubber-elastic holder piece, such that after the placement no micro-tilting of the contact plate arises. Even a slight movement of the hand away from the object surface is compensated to some degree through the rubber-elastic spring action, as is a slight trembling of the placement surface.

The construction in accordance with the invention further permits point measurement with an inclined placement surface, with an angle of tilt of up to 10° or more. With a mechanically rigid joint construction, a deflection also involves a lateral displacement of the contact plate, out of the axis of symmetry of the device. In contrast, with a rubber-elastic holder, this leads to compression on one side. Thereby, the force of displacement parallel to the object surface is less and the contact plate stays in place, bearing on the surface.

The rubber-elastic holder construction affords overload protection against pressing-on too firmly. If the pressing-on force is too great, the rubber holder folds in the middle. The contact plate can thus be pressed against the object surface only with a definite maximum force. Moreover, the pressing-on force regulates itself, to a certain degree, through the modulus of expansion/compression of the rubber holder so that the contact plate is each time pressed against the object with a similar pressure. The measurements are thus reproducible.

Further, rubber-elastic materials are good heat insulators, so that heat flow away from the contact plate is held to a minimum. The rubber-elastic holder indicated below can be manufactured relatively simply, is largely free from wear and cannot become contaminated in the manner of mechanical joints. There are thus provided significant practical and economic advantages in comparison with conventional holders.

In its general configuration, the contact temperature sensor consists of a substantially planar contact plate, preferably round or oval, which may nevertheless if appropriate, for particular applications, be concavely or convexly curved. The contact plate is preferably of a material which is a good heat conductor of low thermal capacity, such as copper or aluminium. For reducing heat radiation and for improvement of contact, i.e. for better heat conduction from the object to the contact plate, the contact plate may be silver plated or can be made entirely of silver. It can also be expedient to gold plate the contact plate to prevent corrosion or the collection of contamination.

The contact plate is fastened to the forward end of a deflectable and tiltable holding device. The holding device in accordance with the invention is of a rubber-elastic, thermally insulating material, preferably of silicone rubber or a natural or artificial rubber. The rubber or silicone material preferably has a Shore hardness from 20 to 90, more preferably from 40 to 60, and particularly preferably between 50 and 60, since there then results—for example with a cylindrical holder having a length of ca. 2 cm and a diameter of 6 mm—a bendability and spring action appropriate for a hand-held holder. A spring action appropriate for a hand-held holder is in general provided when the holding device is compressed lengthwise by 2 to 10% when subjected to a perpendicular placement force of ca. 100 g. An appropriate bendability is afforded when the forward end of the rubber holder is deflected by ca. 1 to 5 mm when subjected to a lateral force of 10 g parallel to the placement surface. Because of the temperature measurement range, rubber materials with thermally stable properties up to ca. 350° C. are preferred.

The contact plate is directly attached in or on the forward end face of the cylindrical holder system, for example by gluing or vulcanisation. The contact plate thus possesses preferably hook-like projections on one side, so that the rubber holder and the plate engage one into the other, for secure connection.

In another preferred embodiment, the holder is a tube the inside of which is filled with a thermally insulating elastic rubber material, in particular silicone rubber. This is intended on the one hand, to stiffen the holder tube and protect it against folding under a medium pressing-on force, and on the other hand, to mechanically protect the connection lines to the contact plate which run within the interior of the tube.

The temperature element lies on the side of the contact plate away from the bearing surface. The temperature element is preferably a thermocouple element for which, over temperature intervals which are not too large, the thermoelectric voltage is proportional to the temperature difference, for example as with the combination of Fe-constantan or Cu-constantan. Particularly preferred is a Ni—Cr—Ni thermocouple element. The temperature element may also be a semiconductor sensor element, in particular a silicon sensor element, or a metallic film sensor element. The temperature of the contact plate can also be detected by temperature sensitive measurement resistors. The temperature sensitive element is preferably attached to the contact plate by a heat conductive adhesive.

The metallic contact lines to the measuring element, in the tube, are coiled so that the temperature gradient towards the holding device is flatter. In this way, heat flow away from the contact plate through the metallic contact lines is reduced. Moreover, the coiling of the lines provides protection against mechanical breakage, in particular upon a large deflection or a severe tilting of the contact plate.

In a particularly preferred embodiment of the invention, the rubber-elastic holder comprises an internal tube around which at least one coil-like line ot the sensor element is wound. If applicable, the line can be glued to the internal tube. The second line to the measuring element can then run within the tube in the form of a coil; if applicable, the inner line is glued from the inside to the wall of the internal tube. The internal tube is then vulcanised with a rubber-elastic material. Preferably, this is carried out in one step together with the attachement by vulcanisation of the contact plate.

BRIEF DESCRIPTION OF THE DRAWINGS

Further advantages of the embodiments of the invention are described below with reference to the examples and to the drawings, which show.

DETAILED DESCRIPTION OF PREFERRED EMBODIMENTS OF THE INVENTION

Figure 1:
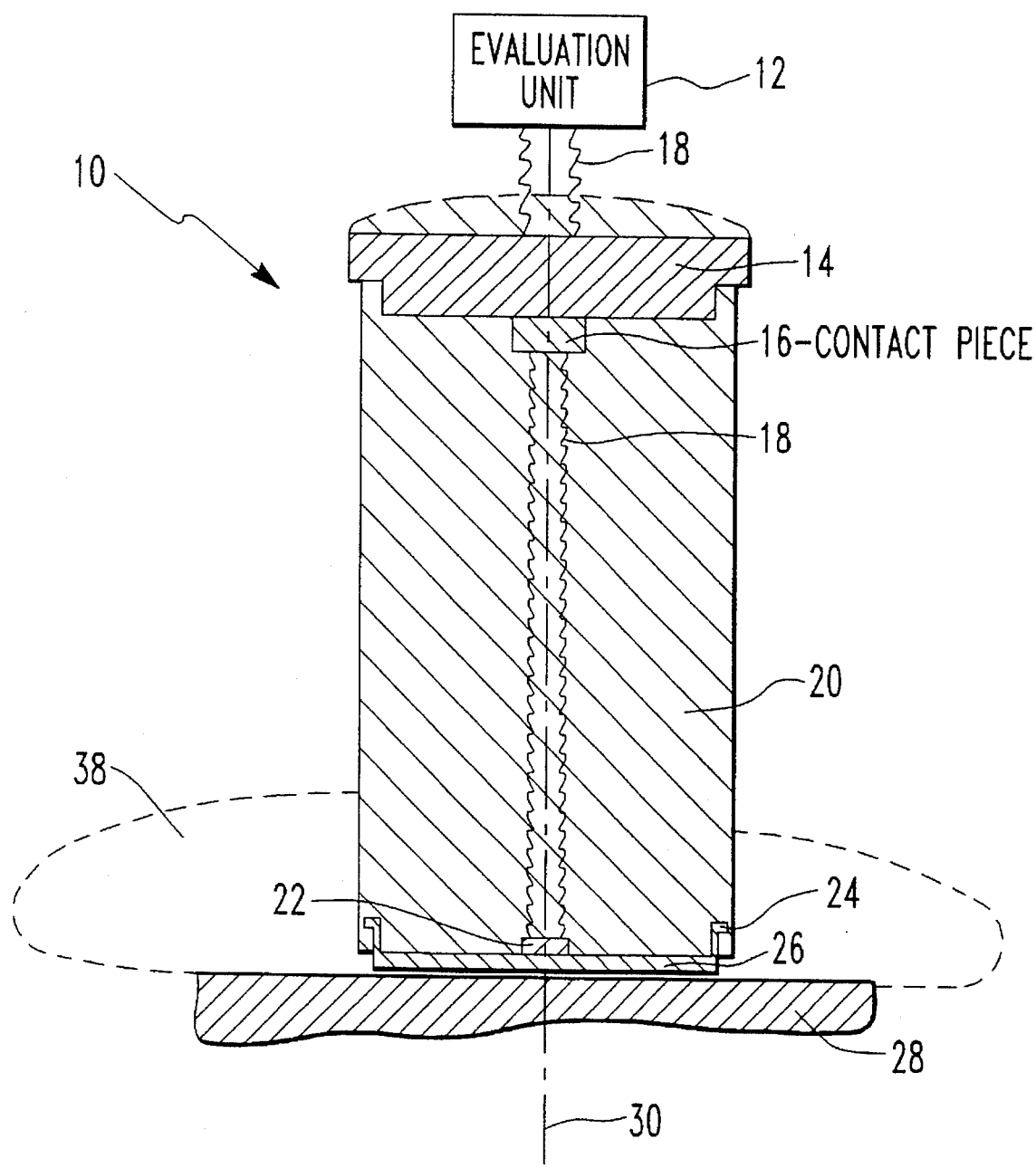
FIG. 1 a partial perspective view of a contact temperature sensor in section.

FIG. 1 shows a contact temperature sensor (10) including generally a holder body of a rubber-elastic rubber material (20) preferably in the form of a cylinder, and a contact plate (26) vulcanised onto the front end face of the cylinder with holder or counter-hooks (24), such that the rubber-elastic holder system and the contact plate (26) engage one into the other to provide a firm connection. The contact plate (26) extends slightly beyond the rubber-elastic rubber material, so that an undisturbed contact with the object (28) surface (38) can be achieved, the surface (38) of the object (28) being shown in each of the figures in perspective in chain line. A thermocouple element (22) is attached on the inner side of the contact plate (26) by heat conducting adhesive. The thermocouple element (22) is contacted via two coiled electrical connection lines (18). The term electrical connection lines, or lines (18) as used herein shall mean wires, conductors or any similar item known to function as a carrier of an electric signal from a thermocouple element through a contact to a means for evaluating the signal. The lines (18) lead to a mechanically stable holder element (14), onto which the rear end face of the cylindrical rubber material (20) is vulcanised or glued. The lines (18) lead to an electrical contact piece (16) in the holder element (14). The holder system of rubber material (20) is 2 to 4 cm, preferably ca. 2 cm, long; the diameter of the cylinder is ca. 6 mm. The formed holder body of the rubber-elastic material (20) is preferably produced in situ by vulcanisation upon assembly of all of the components of the sensor (10). The electrical temperature signals from the thermocouple element are ultimately detected in an evaluation unit (12) and either directly converted into temperature values or the surface temperature of the measurement object is extrapolated from the temporal variation of the sensor temperature and material-specific and contact-specific constants. The arrangement as a whole is preferably symmetrical about an axis (30), so as to counter any spatial preference with regard to, for example, tilt tendency or temperature flow.

Figure 2:
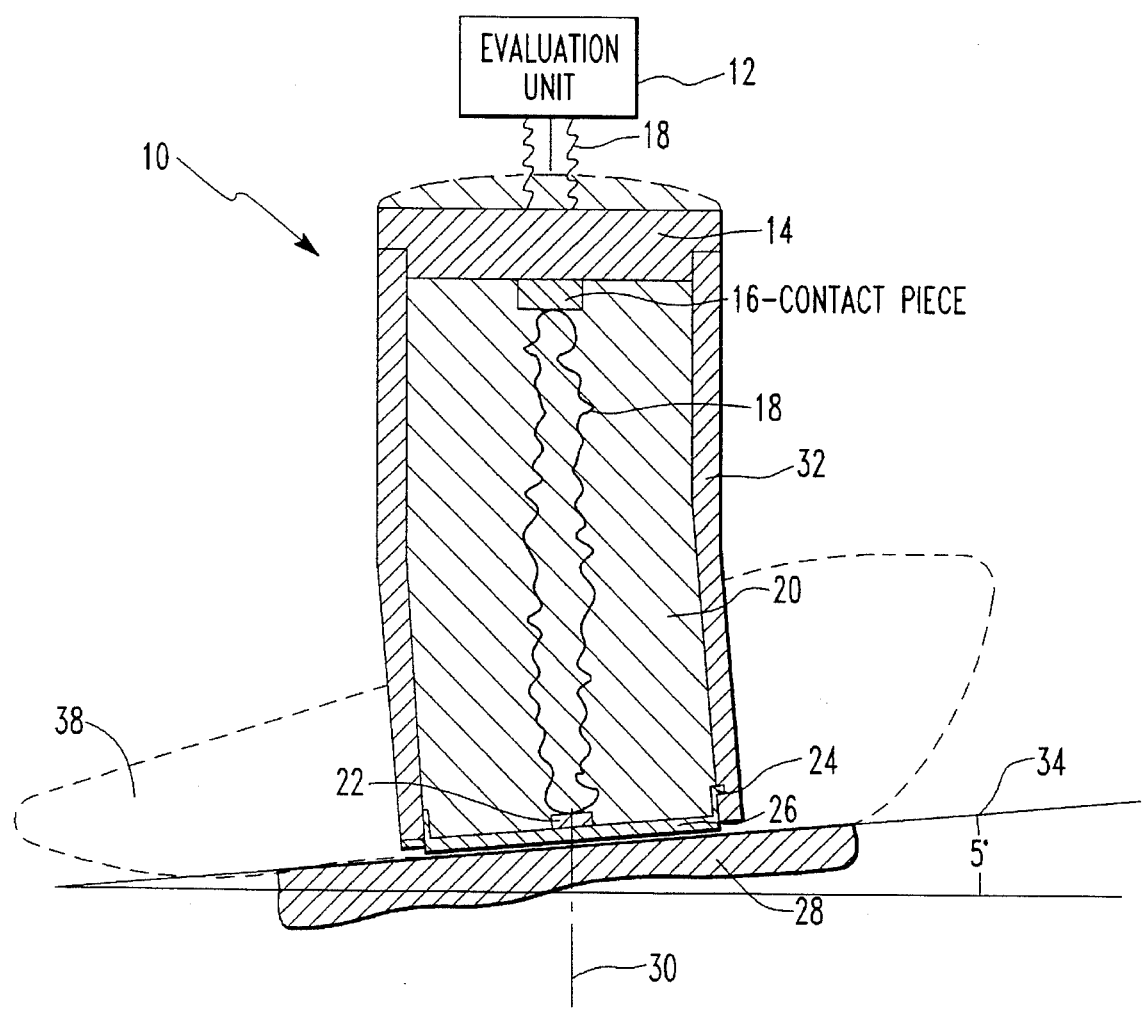
FIG. 2 a contact temperature sensor (external tube form) in section on a tilted measurement object surface; and, FIG. 3 a contact temperature sensor with an internal tube.

FIG. 2 shows a contact temperature sensor in accordance with the invention where the contact plate (26) is placed against a surface (38) tilted by, for example, 5°. In this embodiment, the contact plate (26) is attached to the forward end of a holder tube (32). The internal volume of the holder tube (32) is filled with a rubber-elastic and heat insulating rubber material (20). By appropriate selection of the rubber-elastic material, the device can readily be constructed to deal with tilting (34) of the contact plate with respect to the middle axis of the measurement sensor by up to 20°.

Figure 3:
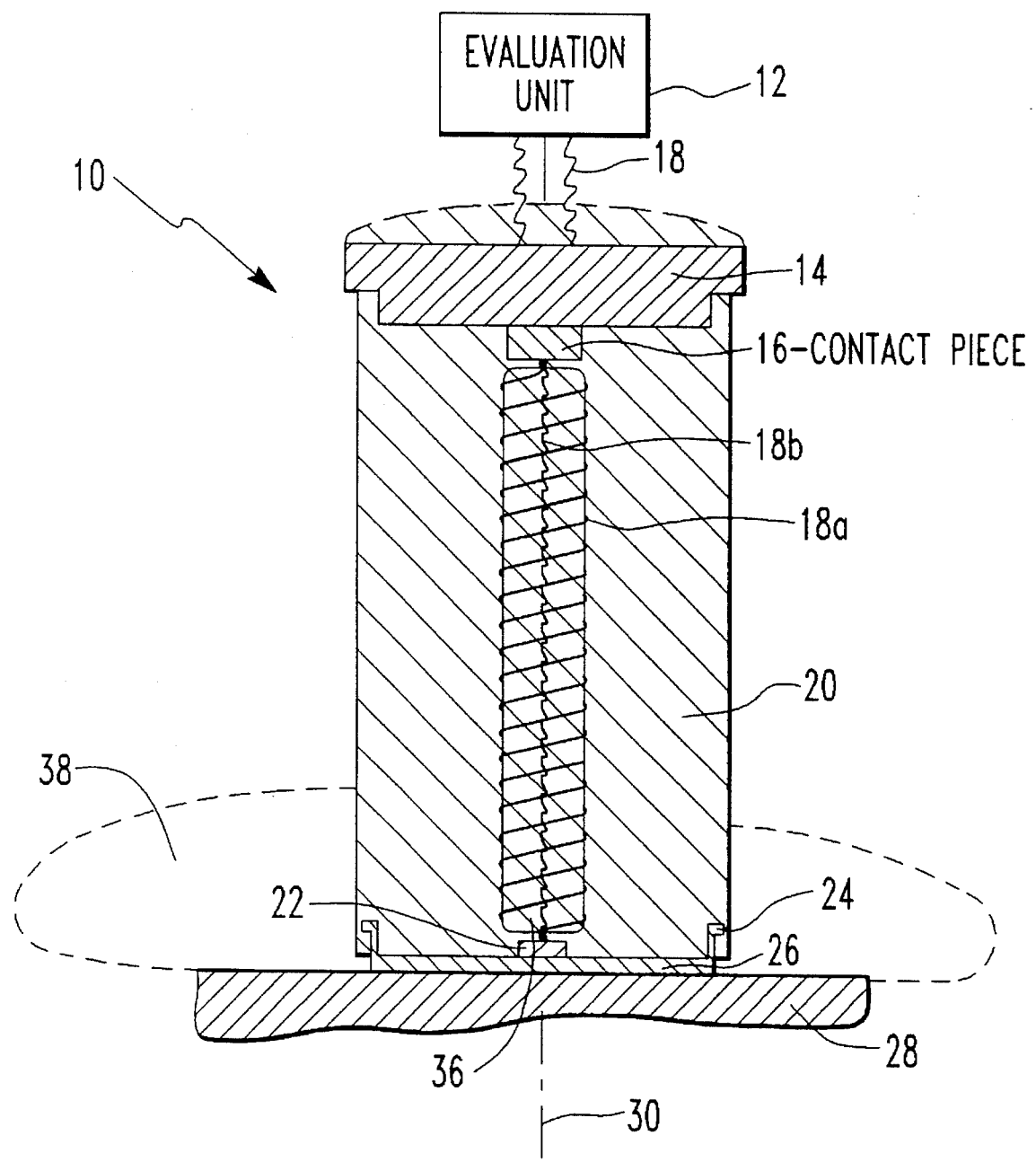

FIG. 3 shows probably the best embodiment of the invention. The connection lines (18) which extend from the thermocouple element (22), a Ni—Cr—Ni element, include one externally placed line (18a) wound around an inner elastic tube (36) and one internally placed line (18b) which is positioned within the inner tube (36). The externally placed connection line (18a) is glued to the inner elastic tube (36). The projecting parts are filled or surrounded by a rubber-elastic material (20) having a Shore hardness of ca. 40, and they are then vulcanised together to provide a 2 cm long and 0.6 mm thick cylindrical holding system. Here, the contact plate (26) has a diameter of ca. 6 mm and is ca. 0.2 mm thick. The contact plate is slightly overlapped by the vulcanisable material (20). The material of the contact plate (26) is silver plated copper. The other elements of the contact temperature sensor are formed as described with reference to FIGS. 1 and 2.

Such a temperature sensor has, astonishingly, provided actual surface temperature, with a routine accuracy of 0.1K, after a measurement time of less than 30 seconds when hand-held. The initial temperature difference between contact plate and object was then equalized to at least >98% (at −35° to +220° C.) by the heat flow.

What is claimed is:

1. A contact temperature sensor comprising:

a contact plate of heat conductive material;

a temperature element attached to the contact plate for detecting the temperature of the contact plate; and, a deflectable and tiltable holding system for placement of the contact plate flush with the surface of an object of measurement, wherein the holding system is comprised essentially of a formed holder body of rubber-elastic material for hand held manipulation of the contact plate for obtaining elastic spring action, deflectability and tiltability of the contact plate with respect to a surface of the object of measurement.

2. The contact temperature sensor according to claim 1 wherein the rubber-elastic material has thermally insulating properties.

3. The contact temperature sensor according to claim 1 wherein the rubber-elastic material is natural or artificial rubber having a Shore hardness from 20 to 90.

4. The contact temperature senor according to claim 3 wherein said rubber-elastic material is silicone rubber.

5. The contact temperature sensor according to claim 1 wherein the holding system has an inner elastic tube and at least one connection line from the temperature element coiled in contact with the inner elastic tube.

6. The contact temperature sensor according to claim 1 wherein the formed holder body of rubber-elastic material is produced in situ by vulcanization upon assembly.

7. The contact temperature sensor according to claim 1 wherein the contact plate and the formed holder body of rubber-elastic material are bound one to the other by vulcanization.

8. The contact temperature sensor according to claim 1 wherein the contact plate is of material of high heat conductivity and low heat capacity.

9. The contact temperature sensor according to claim 1 wherein the temperature element is a thermocouple element.

10. The contact temperature sensor according to claim 9 wherein the thermocouple element is a Ni—Cr—Ni material.

11. The contact temperature sensor according to claim 1 wherein the rubber-elastic material is selected from the group consisting of natural or artificial rubber having a Shore hardness from 40 to 60.

12. The contact temperature sensor according to claim 1 wherein said formed holder body has a longitudinal axis and can bend greater than 10° relative to the axis.

\* \* \* \* \*